United States Patent
Nair et al.

(10) Patent No.: US 11,556,938 B2
(45) Date of Patent: Jan. 17, 2023

(54) MANAGING REGULATORY COMPLIANCE FOR AN ENTITY

(71) Applicant: INTERNATIONAL BUSINESS MACHINES CORPORATION, Armonk, NY (US)

(72) Inventors: Rahul Nair, Dublin (IE); Killian Levacher, Dublin (IE); Martin Stephenson, Ballynacargy (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 390 days.

(21) Appl. No.: 16/241,658

(22) Filed: Jan. 7, 2019

(65) Prior Publication Data

US 2020/0219111 A1 Jul. 9, 2020

(51) Int. Cl.
| | |
|---|---|
| *G06Q 30/00* | (2012.01) |
| *G06Q 50/26* | (2012.01) |
| *G06Q 10/06* | (2012.01) |
| *G06N 5/02* | (2006.01) |
| *G06N 20/00* | (2019.01) |
| *G06F 40/30* | (2020.01) |
| *G06F 40/205* | (2020.01) |
| *G06F 40/284* | (2020.01) |

(52) U.S. Cl.
CPC ......... *G06Q 30/018* (2013.01); *G06F 40/205* (2020.01); *G06F 40/284* (2020.01); *G06F 40/30* (2020.01); *G06N 5/022* (2013.01); *G06N 20/00* (2019.01); *G06Q 10/0635* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 7,937,319 B2 | 5/2011 | Kennis | |
| 9,123,024 B2 | 9/2015 | Levine | |
| 2004/0107124 A1 | 6/2004 | Sharpe | |
| 2005/0182736 A1* | 8/2005 | Castellanos | G06F 40/295 705/80 |
| 2016/0070758 A1* | 3/2016 | Thomson | G16H 10/60 707/781 |
| 2016/0140210 A1* | 5/2016 | Pendyala | G06Q 50/18 707/737 |
| 2016/0371618 A1 | 12/2016 | Leidner | |
| 2017/0236129 A1 | 8/2017 | Kholkar | |

(Continued)

OTHER PUBLICATIONS

S. Sunkle, D. Kholkar and V. Kulkarni, "Informed Active Learning to Aid Domain Experts in Modeling Compliance," 2016 IEEE 20th International Enterprise Distributed Object Computing Conference (EDOC), Vienna, Austria, 2016, pp. 1-10, doi: 10.1109/EDOC.2016.7579382. (Year: 2016).*

(Continued)

*Primary Examiner* — Laura Yesildag
(74) *Attorney, Agent, or Firm* — Griffiths & Seaton PLLC (57) ABSTRACT

Various embodiments are provided for managing regulatory compliance for an entity in a computing environment by a processor. A law, policy, regulation, or a combination thereof extracted from one or more segments of text data from one or more data sources may be identified requiring an obligation to be performed by the entity.

17 Claims, 8 Drawing Sheets

(56) References Cited

U.S. PATENT DOCUMENTS

| | | | |
|---|---|---|---|
| 2018/0053128 A1 | 2/2018 | Costas | |
| 2018/0075554 A1* | 3/2018 | Clark | G06Q 50/18 |
| 2018/0089694 A1 | 3/2018 | Clark | |
| 2018/0121931 A1* | 5/2018 | Bender | G16Y 30/00 |
| 2018/0137107 A1 | 5/2018 | Buccapatnam | |
| 2019/0318362 A1* | 10/2019 | Marascu | G06F 40/295 |
| 2019/0354544 A1* | 11/2019 | Hertz | G06N 20/10 |
| 2020/0293575 A1* | 9/2020 | Drubner | G06N 5/022 |

OTHER PUBLICATIONS

A. Agarwal et al., "Cognitive Compliance for Financial Regulations," in IT Professional, vol. 19, No. 4, pp. 28-35, 2017, doi: 10.1109/MITP.2017.3051333 (Year: 2017).*

S. Sunkle, D. Kholkar and V. Kulkarni, "Informed Active Learning to Aid Domain Experts in Modeling Compliance," 2016 IEEE 20th International Enterprise Distributed Object Computing Conference (EDOC), 2016, pp. 1-10, doi: 10.1109/EDOC.2016.7579382 (Year: 2016).*

D. G. Gordon and T. D. Breaux, "Comparing requirements from multiple jurisdictions," 2011 Fourth International Workshop on Requirements Engineering and Law, 2011, pp. 43-49, doi: 10.1109/RELAW.2011.6050272. (Year: 2011).*

* cited by examiner

MANAGING REGULATORY COMPLIANCE FOR AN ENTITY

BACKGROUND OF THE INVENTION

Field of the Invention

The present invention relates in general to computing systems, and more particularly to, various embodiments for managing regulatory compliance for an entity using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entity's survival and adaptability in a highly competitive environment. Also, many businesses and organizations, such as financial institutions, employing the use of computing systems and online data must ensure operations, practices, and/or procedures are in compliance with general business protocols, corporate compliance, and/or legal regulations, policies, or requirements.

SUMMARY OF THE INVENTION

Various embodiments for managing regulatory compliance for an entity in a computing environment by a processor are provided. In one embodiment, by way of example only, a method for managing regulatory compliance for an entity, again by a processor, is provided. A law, policy, regulation, or a combination thereof extracted from one or more segments of text data from one or more data sources may be identified requiring an obligation to be performed by the entity.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As the amount of electronic information continues to increase, the demand for sophisticated information access systems also grows. Digital or "online" data has become increasingly accessible through real-time, global computer networks. The data may reflect many aspects of topics ranging from scientific, legal, educational, financial, travel, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, entities (e.g., businesses, governments, organizations, academic institutions, etc.) may be subject to certain processes, policies, guidelines, rules, laws, and/or regulations relevant to the entities. Compliance with these processes, policies, guidelines, rules, laws, and/or regulations is critical and essential to ensure integrity of the company while also avoiding violations, fines, or legal punishment. For example, regulatory compliance management is a supreme matter of paramount importance to organizations as new regulations emerge on an on-going basis. In one aspect, regulatory compliance is an entity's adherence to laws, regulations, guidelines and specifications relevant to its purpose or business. These enterprises/entities often require human interaction with various skills and expertise (e.g., a subject matter expert (SME)) to support compliance across the enterprise. Thus, given the vast amount of text data and the pace at which regulation documents change, various embodiments are provided herein to automatically identify and search legislation, processes, policies, guidelines, rules, laws, and/or regulations and also identify the compliance entities and the regulations that apply to their specific organizational need (e.g., to spot the changing elements).

As such, the present invention provides for managing regulatory compliance for an entity in a computing environment. In one aspect, legislation, laws, policies, regulations, or a combination thereof may be extracted from one or more segments of text data from one or more data sources may be identified requiring an obligation to be performed by the entity.

In an additional aspect, the present invention provides a cognitive system that provides automated procedures to ingest regulatory text, extraction of regulatory targets, entities, and requirements to determine the scope of specific legislation. One or more entities may be extracted from the ingested data for analytics on the extracted entities. For example, the cognitive system may be used to do cross-jurisdictional analysis such as, for example: "are my business processes in jurisdiction A compliant with regulatory environment in jurisdiction B?," "What legislation applies to a shipping decision from country A to country B?," and/or "how are definitions of 'Batteries' different in Thailand and South Africa?"

In one aspect, a one or more entities may be extracted using one or more natural language processing (NLP) and/or named-entity recognition (NER) operations. A NER operation may be a subtask of information extraction that may locate and classify named entities in text into pre-defined categories such as, for example, persons, entities, organizations, and locations. A set of sentences with an obligation-like content may be determined (e.g., computed) using the extraction operation and one or more filtering operations applied to the content of semantic roles from the sentences. A machine learning (ML) classifier may be used to determine if a selected segment/clause of the ingested text data is an obligation/requirement.

In one aspect, as used herein, the term regulation may be a document written in natural language containing a set of legislation, laws, policies, regulations, regulatory targets, entities, and requirements specifying obligations, obligation targets, constraints and preferences pertaining to the desired structure and behavior of an enterprise. A regulation may specify the domain elements it applies to. For example, regulations may be a law (e.g., a health care law, environmental protection laws, aviation laws, etc.), a standardization document, a contract, and the like. Also, as used herein, the type of entities of interest include for example, "definitions" that are clauses/text segments that define/represent stakeholders or specific equipment. That is, "definitions" may be clauses within legal text that define specific actors, entities, and/or stakeholders governed by the text (e.g., the legal text such as, for example, a rule/law/policy of a particular jurisdiction). Definition targets may be the definition entity and definition content may be clauses/text segments that describe the target. Also, an "obligation" may be a clause that represents legal requirements. An obligation target is a legislative target of a specific clause. Obligation content may be a requirement that applies to a target.

Also, the term "domain" is a term intended to have its ordinary meaning. In addition, the term "domain" can include an area of expertise for a system or a collection of material, information, content and/or other resources related to a particular subject or subjects. For example, a domain can refer to a regulatory, legal, policy, governmental, financial, healthcare, advertising, commerce, scientific, industrial, educational, medical, biomedical-specific information, or other area or information defined by a subject matter expert. A domain can refer to information related to any particular subject matter or a combination of selected subjects.

The term "ontology" is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, regulatory compliance information, policy information, legal information, governmental information, business information, educational information, or any other information group. The ontology can be continuously updated with the information synchronized with the sources, adding information from the sources to the ontology as models, attributes of models, or associations between models within the ontology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
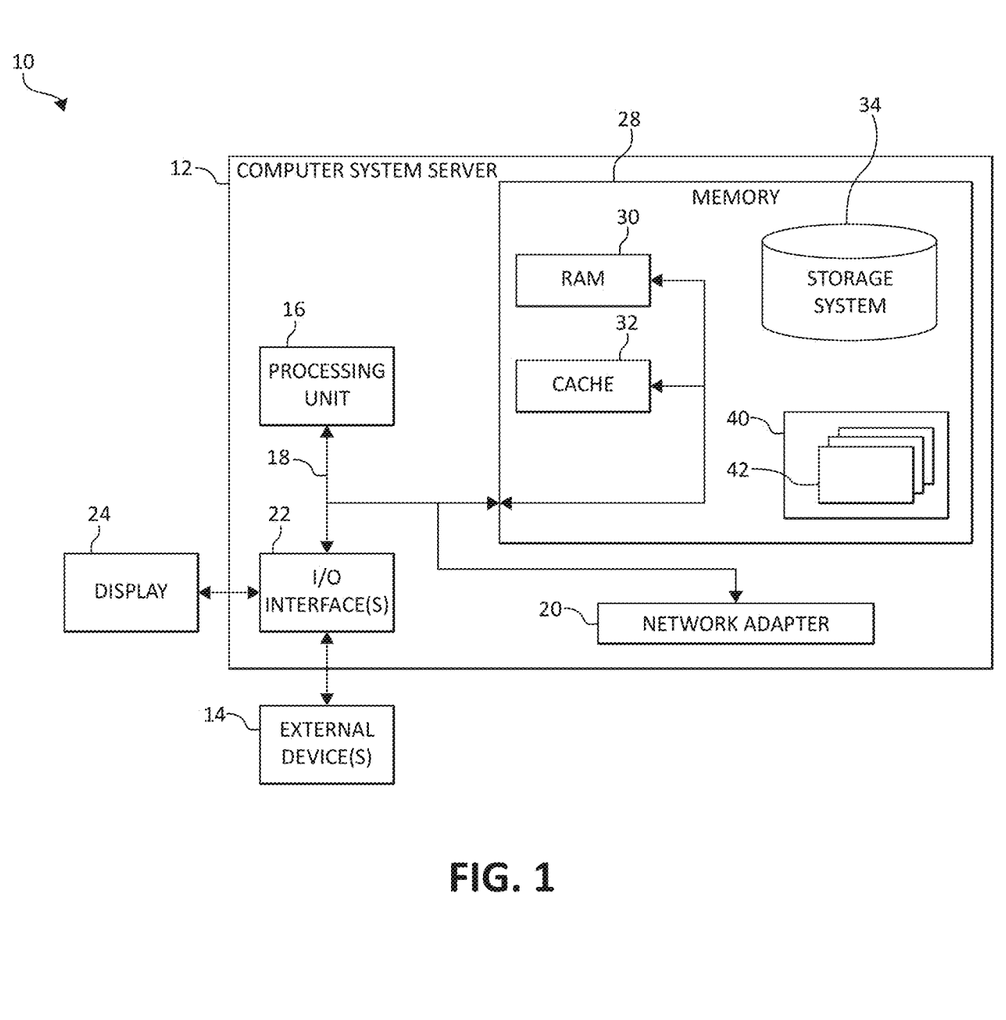
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
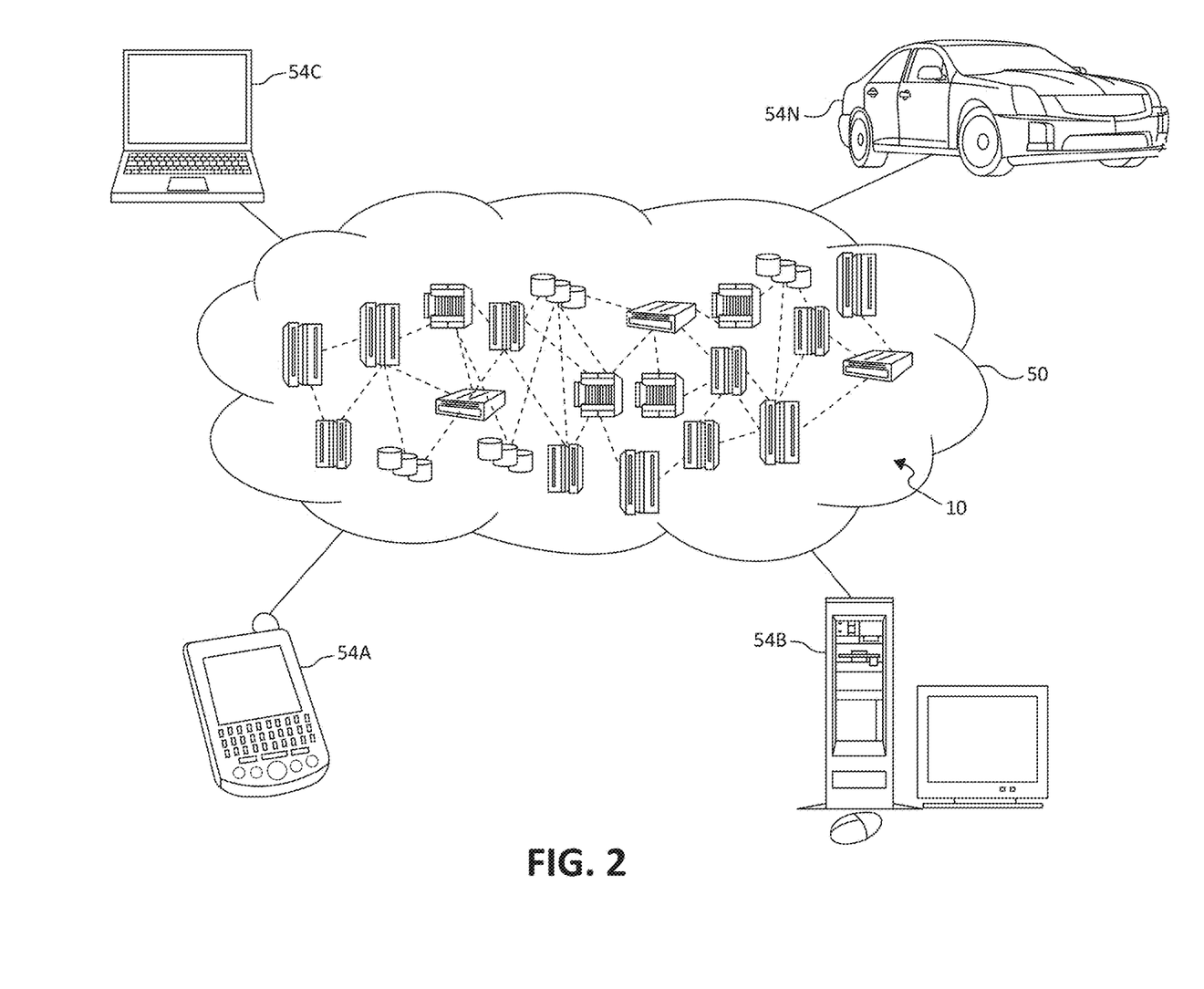
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
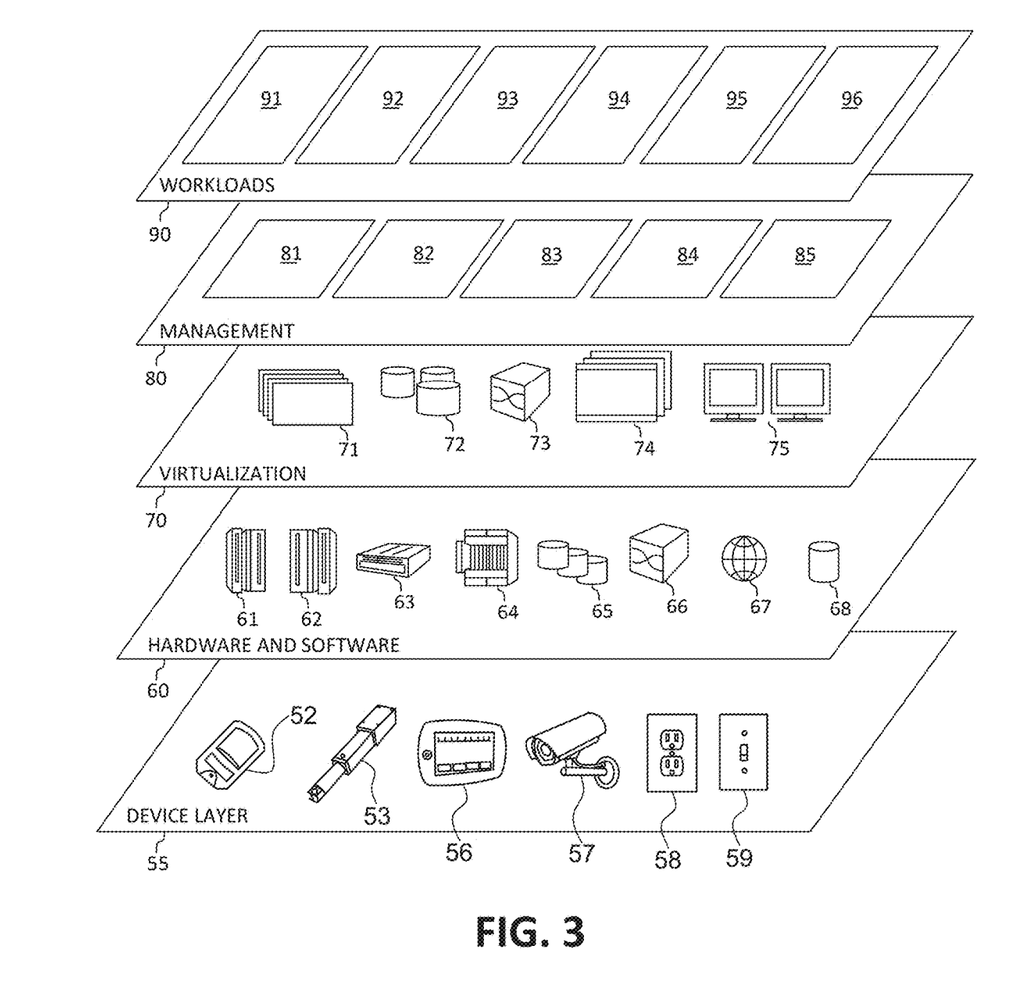
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various regulatory compliance management workloads and functions 96. In addition, regulatory compliance management workloads and functions 96 may include such operations as analytics, entity and obligation analysis, and as will be further described, user and device management functions. One of ordinary skill in the art will appreciate that the regulatory compliance management workloads and functions 96 may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Figure 4:
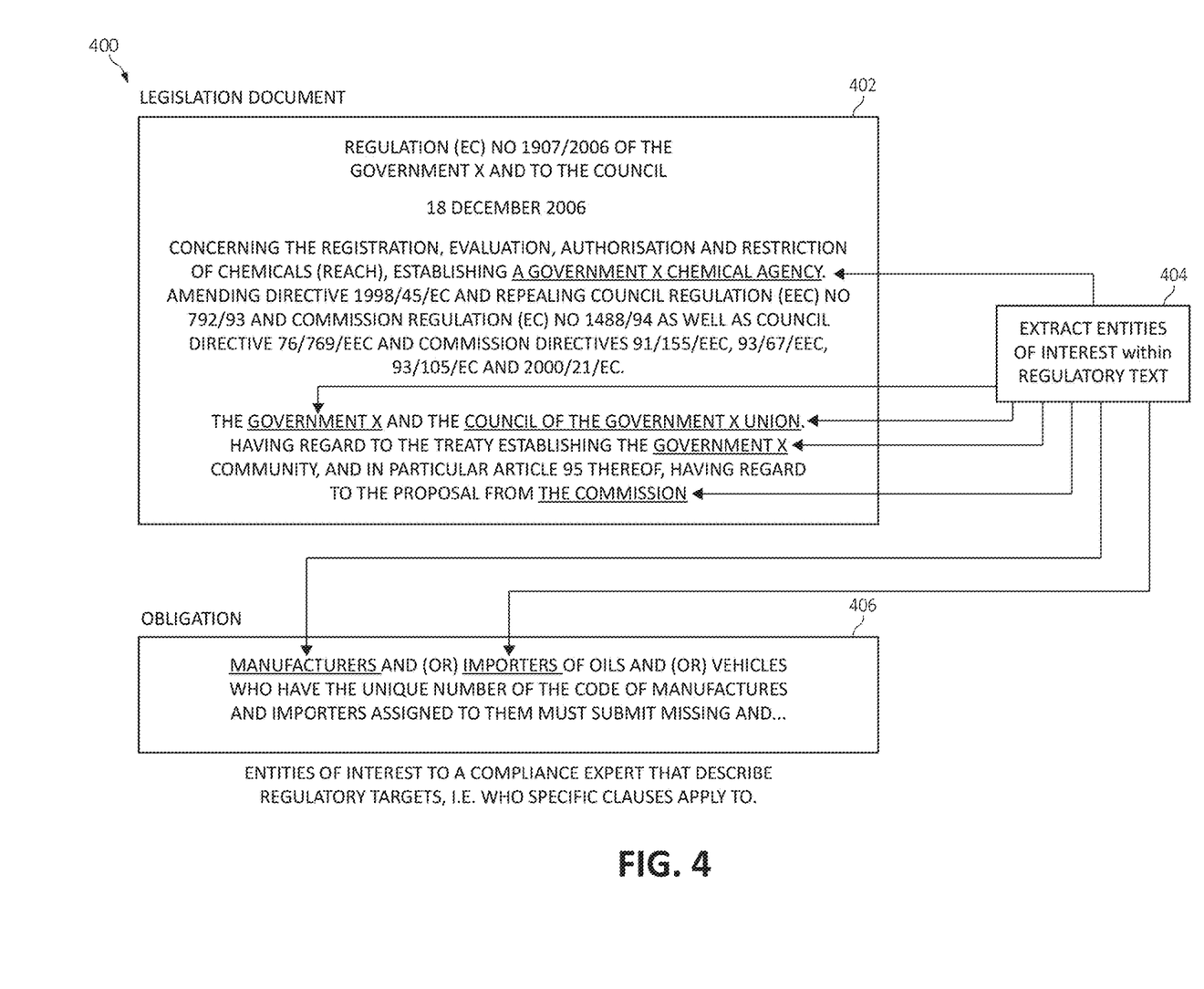
FIG. 4 is an additional diagram depicting management of regulatory compliance for an entity in accordance with aspects of the present invention.

Turning now to FIG. 4, a diagram depicting a block/flow diagram 400 for automatic extraction of data (e.g., entities and/or legislation) according to various mechanisms of the illustrated embodiments is shown. For example, a legislation document 402 (from one or more data sources) may be analyzed and text data may be ingested via an entity/obligation extraction component 404. One or more segments of text data (e.g., entities, laws, policies, regulations, or a combination thereof) from one or more data sources may be extracted from the legislation document 402. Each entity within the regulatory text (e.g., the legislation document 402) may be identified and extracted. Each obligation 406 (e.g., legal, policy, regulatory, or procedural requirement) may be identified and/or associated with each entity. Entities of interest may be extracted that describe regulatory targets (e.g., identify which entities specific clauses apply to).

Figure 5:
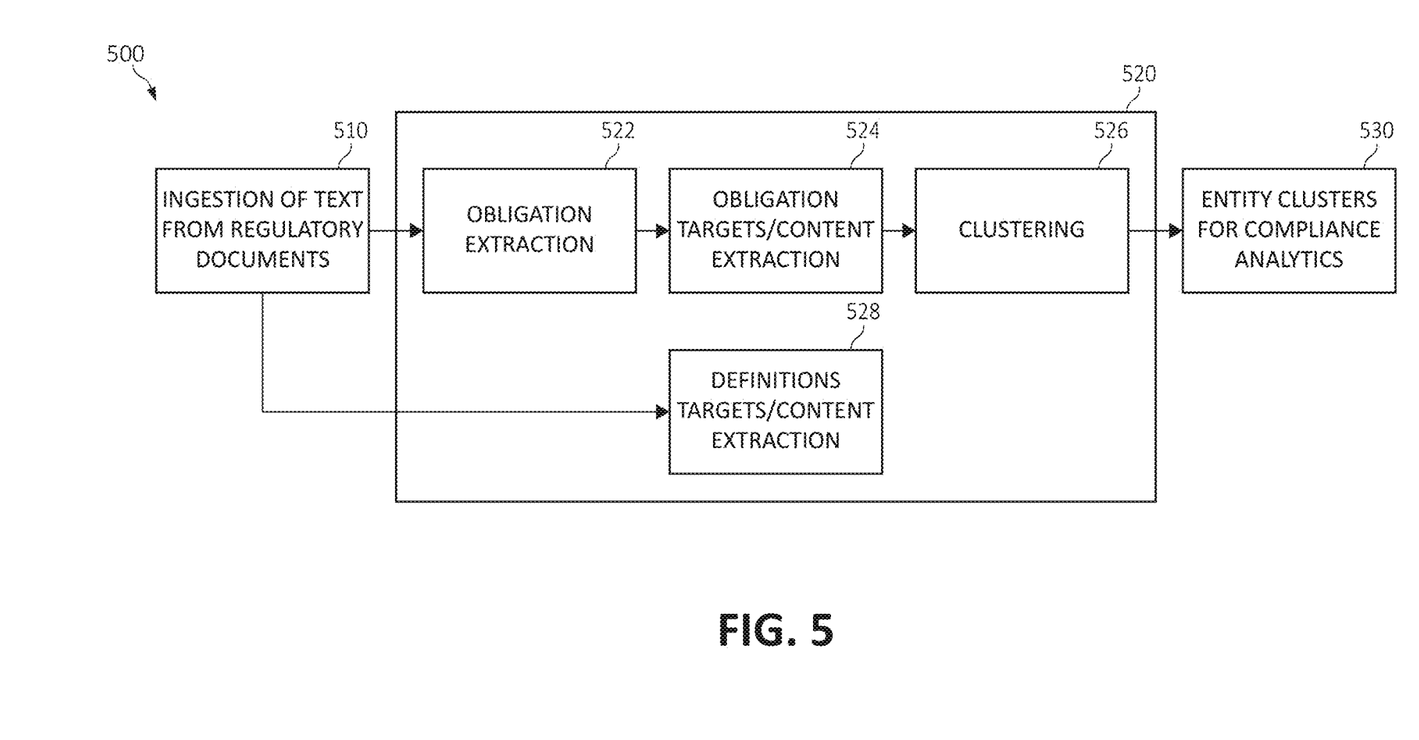
FIG. 5 is a flow diagram for managing regulatory compliance for an entity in accordance with aspects of the present invention.

Turning now to FIG. 5, block/flow diagram 500 is depicting for managing regulatory compliance for an entity. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality described in FIG. 5.

Also, as shown, the various blocks of functionality are depicted with arrows designating the blocks' 500 relationships with each other and to show process flow. As will be seen, many of the functional blocks may also be considered "modules" or "components" of functionality. With the foregoing in mind, the module blocks 500 may also be incorporated into various hardware and software components of a system for managing regulatory compliance for an entity in accordance with the present invention. Many of the functional blocks 500 may execute as background processes on various components, either in distributed computing components, or on the user device, or elsewhere.

In one aspect, at block 510, text data from one or more data sources (e.g., regulatory documents) may be ingested by an ingestion component. The ingestion component may ingest text data and detect entities and obligations using one or more AI operations and/or NLP processes.

In one aspect, the text data (e.g., a legislative document) of one or more data sources may be provided by one or more content contributors. The one or more data sources may be provided as a corpus or group of data sources defined and/or identified. The one or more data sources may include, but are not limited to, data sources relating to one or more documents, regulatory documents, policy documents, legal documents, materials related to regulatory or legal compliance, emails, books, scientific papers, online journals, journals, articles, drafts, and/or other various documents or data sources capable of being published, displayed, interpreted, transcribed, or reduced to text data. The data sources may be all of the same type, for example, pages or articles in a wiki or pages of a blog. Alternatively, the data sources may be of different types, such as word documents, wilds, web pages, power points, printable document format, or any document capable of being analyzed, ingested, used by a natural language processing (NLP) system and/or artificial intelligence (AI) system to provide processed content. For example, the data sources may be processed using a lexical analysis, parsing, extraction of concepts, semantic analysis (e.g., wide-coverage semantic analysis), or a combination thereof and also analyzed by the ingestion component (e.g., using an NLP operation) to data mine or transcribe relevant information from the content of the data sources.

At block 522, an obligation extraction component may extract obligation clauses. That is, the obligation extraction component, at block 522, may extract one or more segments (e.g., sentences) with obligation-like content (e.g., content having direct or inferential semantics that indicate an obligation relating to a law, policy, regulation, or a combination thereof). That is, the obligation extraction component is a supervised ML sentence classifier that determines if a clause is a requirement. The extraction of obligation-like content/segments (e.g., sentences) may include, but is not limited to, extraction of information through a knowledge generation process that may include initial data collection among different sources. Also, the extraction of regulatory, procedural, legal, policy, or other concepts and topics may include, but is not limited to, performing knowledge extraction from natural language text documents including reading input text; transforming the input text into a machine understandable knowledge representation so as to provide knowledge libraries from said documents; and using semantic based means for extracting concepts and their interrelations from said input text. Knowledge structures may be used consisting of regulatory, procedural, legal, policy, or other concepts and topics, such as obligations and violations, and the interrelations of the obligations and violations.

At block 524, an obligation target and content extraction operation may extract entities/targets within clauses identified in block 522. In parallel with, subsequent to, and/or prior to performance of block 522, one or more definition clauses may be extracted, as in block 528. From block 528, the functionality 500 of FIG. 5 may proceed to block 526. Thus, in block 522, obligation clauses are extracted. In block 524, entity/targets may be extracted from within the clauses extracted/identified from block 522. In block 528, definition clauses may be extracted.

The obligation target and content extraction operation may be performed on the obligation extracted clauses/sentences. The obligation target and content extraction operation may extract an obligation target and/or "obligation" that represents legal requirements (including laws, policies, regulations, mandates, responsibilities, or a combination thereof). Said differently, the obligation targets/content extraction component may perform a perceptron algorithm to extract entity classes. It should be noted that an "obligation" represents legal requirements (including laws, policies, regulations, mandates, responsibilities, or a combination thereof). An obligation target is a legislative target of a specific clause. Obligation content may be a requirement that applies to a target.

From block 524, a clustering operation may be performed to generate a cluster of entities identified from the one or more segments/sentences containing the obligations, as in block 526. Using the cluster of entities, the clustering operation may create entity clusters for compliance analytics such as, for example, entity differentiation, as in block 530.

Figure 6:
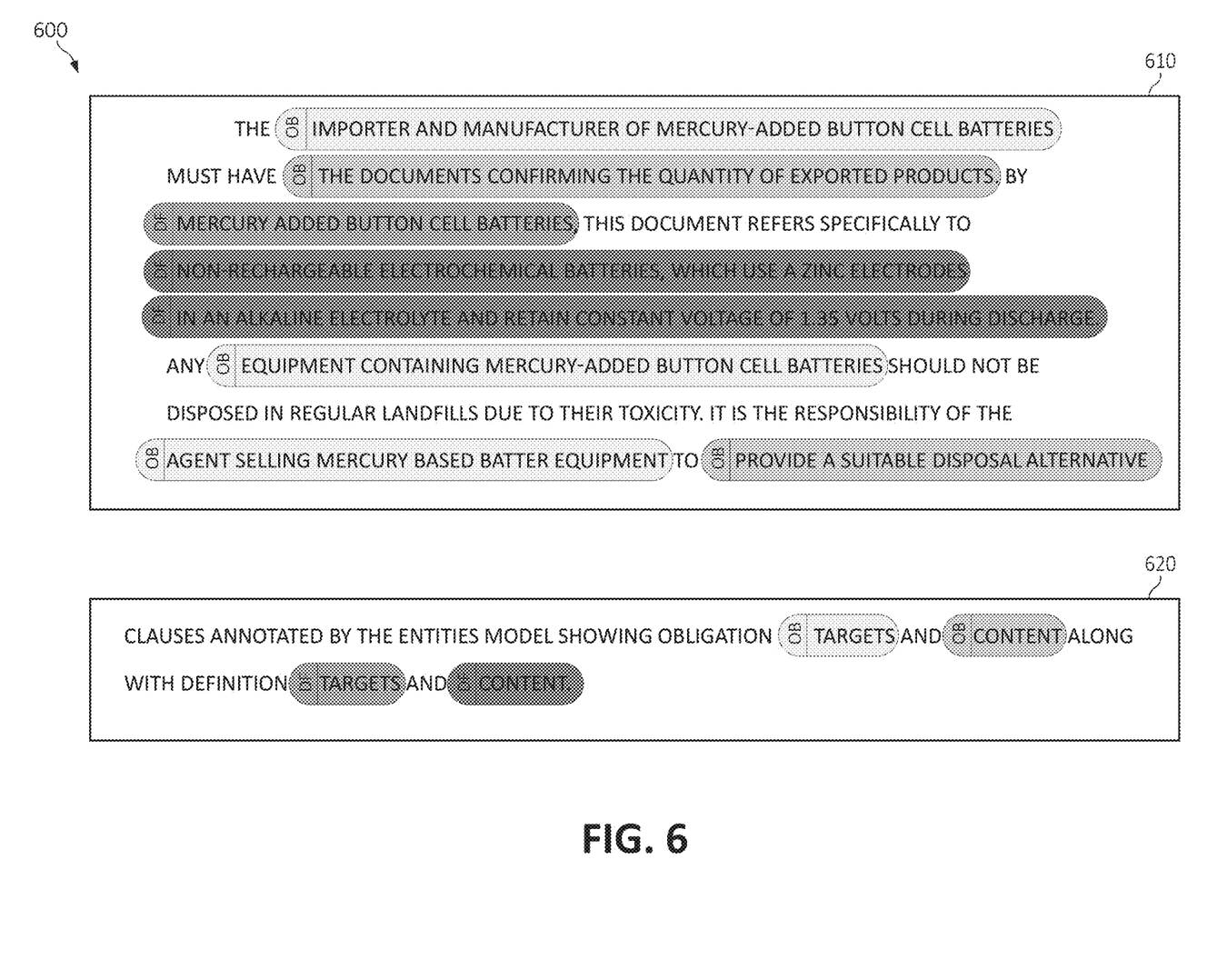
FIG. 6 is a diagram depicting an annotation of entities in which aspects of the present invention may be realized.

Turning now to FIG. 6, diagram 600 depicts a block of text data 610 and 620 having an annotation of entities. In one aspect, one or more of the components, modules, services, applications, and/or functions described in FIGS. 1-5 may be used in FIG. 6. For example, computer system/server 12 of FIG. 1, incorporating processing unit 16, may be used to perform various computational, data processing and other functionality described in FIG. 6.

As depicted in the text data 610 and 620, text data may be annotated by indicating entities having an obligation "OB" and definition "DF." More specifically, from the annotated text data 610 and 620, illustrates clauses annotated by the entities model showing obligation targets ("OB" targets) and content ("OB" content) along with definition targets ("DF" targets) and definition content ("DF" content).

For example, the text data 610 may be mined and filtered. An obligation tag ("OB") and/or definition tag ("DF") may be applied to the text. For example, "importer and manufacturer of mercury-added button cell batteries," "equipment containing mercury-added button cell batteries," and/or "agent selling mercury based button cell batteries" are tagged/annotated as obligation targets. Text data such as, for example, "the documents confirming the quantity of exported products" may be tagged/annotated as "content." Text data such as, for example, "mercury added button cell batteries," "non-rechargeable electrochemical batteries, which use a zinc electrodes," "in an alkaline electrolyte and retain a constant voltage of 1.35 Volts during discharge" may be tagged/annotated as definition targets and definition content.

It should be noted that the annotation of entities and/or text data may be performed via a NLP operation and/or a NER operation (e.g., applying the NER operation in an NLP domain) and may build a dictionary using a domain knowledge of a subject matter expert ("SME") or by employing one or more data mining operations for extraction of obligations that represents legal requirements (including laws, policies, regulations, mandates, responsibilities, or a combination thereof and/or obligation targets/content (e.g., words) from a set of data sources (e.g., documents) "obligation").

Figure 7:
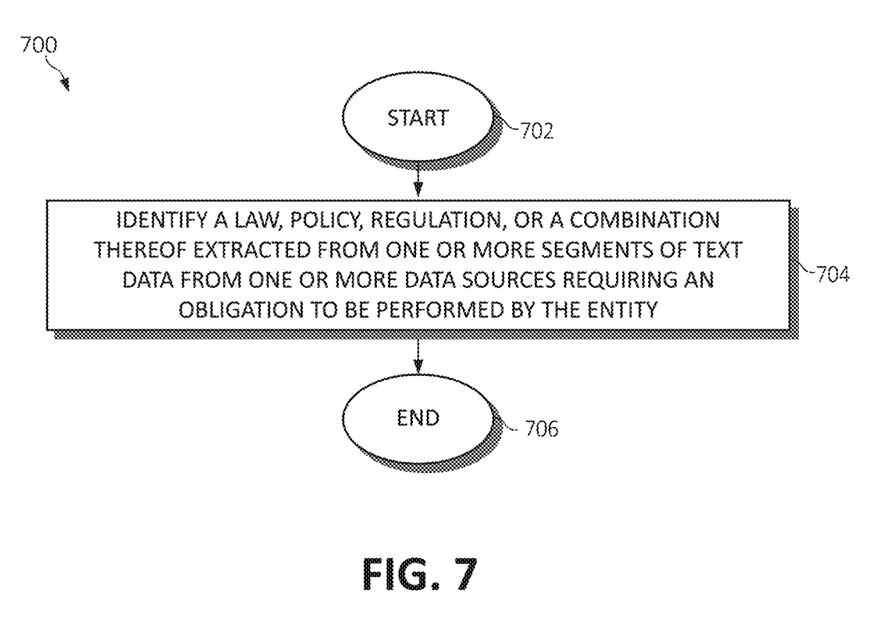
FIG. 7 is a flowchart diagram depicting an exemplary method for managing regulatory compliance for an entity by a processor in which aspects of the present invention may be realized.

Turning now to FIG. 7, a method 700 for managing regulatory compliance for an entity using a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

A law, policy, regulation, or a combination thereof extracted from one or more segments of text data from one or more data sources may be identified requiring an obligation to be performed by the entity, as in block 704. One or more segments of text data may also be extracted from one or more data sources representing one or more objects describing a compliance named entity of type organization expected to conform to an obligation, a law, policy, regulation, or a combination thereof. The functionality 700 may end, as in block 706.

Figure 8:
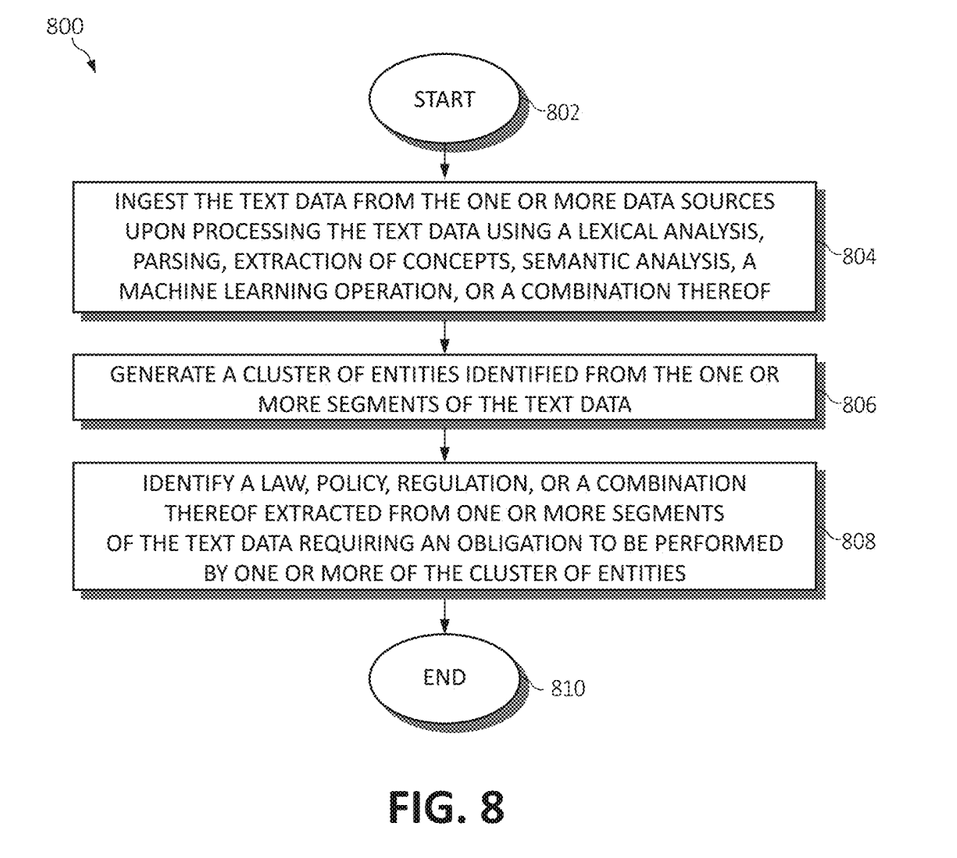
FIG. 8 is a flowchart diagram depicting an exemplary method for managing regulatory compliance for an entity by a processor, again in which aspects of the present invention may be realized.

Turning now to FIG. 8, a method 800 for managing regulatory compliance for an entity using a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

Text data from the one or more data sources may be ingested upon processing the text data using a lexical analysis, parsing, extraction of concepts, semantic analysis, a machine learning operation, or a combination thereof, as in block 804. A cluster of entities identified from the one or more segments of the text data may be generated, as in block 806. One or more segments of text data may be extracted from one or more data sources representing one or more objects describing a compliance named entity of type organization expected to conform to an obligation, a law, policy, regulation, or a combination thereof, as in block 808. The functionality 800 may end, as in block 810.

In one aspect, in conjunction with and/or as part of at least one blocks of FIGS. 7-8, the operations of 700 and/or 800 may include each of the following. The operations of 700 and/or 800 may ingest the text data from the one or more data sources upon processing the text data using a lexical analysis, parsing, extraction of concepts, semantic analysis, a machine learning operation, or a combination thereof. The operations of 700 and/or 800 may identify a defined scope of compliance required by the law, policy, regulation, or a combination thereof.

Additionally, the operations of 700 and/or 800 may use natural language processing (NLP) to determine the one or more segments with obligation content. The one or more segments may be sentences and the obligation content requires an obligation to conform to the obligation, the law, the policy, the regulation, or a combination thereof, initialize a machine learning mechanism to learn, determine, or identify the obligation from the one or more segments of the text data, and/or generate a compliance corpus from training one or more machine learning models for managing regulatory compliance. A cluster of entities may be identified from the one or more segments of the text data. The operations of 700 and/or 800 may define an obligation as a required action for compliance with a law, policy, regulation, or a combination thereof, a prohibition of conduct, behavior, or activity of the entity, a legal right, a constraint of the entity, or a combination thereof.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for managing regulatory compliance for an entity in a computing environment by a processor, comprising:

receiving text data from one or more data sources;

extracting one or more segments of the text data according to the one or more segments of the text data including information associated with a predefined obligation constraint, wherein the predefined obligation constraint includes obligatory language having at least one clause;

executing machine learning logic to train, in a first training stage, a sentence classifier to determine the at least one clause is a definite obligatory requirement, wherein the sentence classifier is trained using a supervised machine learning operation;

executing the machine learning logic to train, in a second training stage, the sentence classifier to identify the entity within the one or more segments of the text data, wherein training the sentence classifier in the second training stage includes executing the machine learning logic to associate the definite obligatory requirement with the entity;

identifying, according to an implementation of the trained sentence classifier, a law, a policy, a regulation, or a combination thereof extracted from the one or more segments of text data from the one or more data sources requiring an obligation to be performed by the entity, wherein the law, the policy, the regulation, or the combination thereof is incorporated into at least one obligation model of an ontology;

executing the machine learning logic to generate a cluster of entities, inclusive of the entity, to associate the obligation with respective entities of the cluster of entities, wherein a clustering operation is performed to generate the cluster of entities for compliance analytics to differentiate the respective entities with respect to a burden of the respective entities to the obligation;

annotating the one or more segments of the text data according to the identifying by applying, within the text data, an obligation target tag to the entity governed by the obligation, an obligation content tag to descriptive portions of the obligatory language, a definition target tag to a referent of the obligation, and a definition content tag to descriptive portions of the referent;

in conjunction with differentiating the respective entities, receiving a user query through an interface, in natural language, specifying a first jurisdictional region and a second jurisdictional region different from the first jurisdictional region, a subject, and an inquiry of specific differences of the law, the policy, the regulation, or the combination thereof with respect to the subject between the first jurisdictional region and the second jurisdictional region; and executing the machine learning logic to iteratively and continuously update the at least one obligation model of the ontology, wherein continuously updating the at least one obligation model includes continuously synchronizing information from the at least one data source in the ontology to form associations between the at least one obligation model and alternative models to enhance an accuracy of the machine learning logic in identifying additional laws, policies, regulations, or combinations thereof.

2. The method of claim 1, further including ingesting the text data from the one or more data sources upon processing the text data using a lexical analysis, parsing, extraction of concepts, semantic analysis, or a combination thereof.

3. The method of claim 1, further including identifying a defined scope of compliance required by the law, the policy, the regulation, or a combination thereof.

4. The method of claim 1, further including using natural language processing (NLP) to determine the one or more segments with obligation content, wherein the one or more segments are sentences and the obligation content requires the obligation to conform to the law, the policy, the regulation, or a combination thereof.

5. The method of claim 1, further including generating a compliance corpus from training one or more machine learning models for managing regulatory compliance.

6. The method of claim 1, further including defining the obligation as a required action for compliance with the law, the policy, the regulation, a prohibition of conduct, behavior, or activity of the entity, a legal right, a constraint of the entity, or a combination thereof.

7. A system, for managing regulatory compliance for an entity in a computing environment, comprising:
one or more processors with executable instructions that when executed cause the system to:
receive text data from one or more data sources;
extract one or more segments of the text data according to the one or more segments of the text data including information associated with a predefined obligation constraint, wherein the predefined obligation constraint includes obligatory language having at least one clause;
execute machine learning logic to train, in a first training stage, a sentence classifier to determine the at least one clause is a definite obligatory requirement, wherein the sentence classifier is trained using a supervised machine learning operation;
execute the machine learning logic to train, in a second training stage, the sentence classifier to identify the entity within the one or more segments of the text data, wherein training the sentence classifier in the second training stage includes executing the machine learning logic to associate the definite obligatory requirement with the entity;
identify, according to an implementation of the trained sentence classifier, a law, a policy, a regulation, or a combination thereof extracted from one or more segments of text data from one or more data sources requiring an obligation to be performed by the entity, wherein the law, the policy, the regulation, or the combination thereof is incorporated into at least one obligation model of an ontology;
execute the machine learning logic to generate a cluster of entities, inclusive of the entity, to associate the obligation with respective entities of the cluster of entities, wherein a clustering operation is performed to generate the cluster of entities for compliance analytics to differentiate the respective entities with respect to a burden of the respective entities to the obligation;
annotate the one or more segments of the text data according to the identifying by applying, within the text data, an obligation target tag to the entity governed by the obligation, an obligation content tag to descriptive portions of the obligatory language, a definition target tag to a referent of the obligation, and a definition content tag to descriptive portions of the referent;
in conjunction with differentiating the respective entities, receive a user query through an interface, in natural language, specifying a first jurisdictional region and a second jurisdictional region different from the first jurisdictional region, a subject, and an inquiry of specific differences of the law, the policy, the regulation, or the combination thereof with respect to the subject between the first jurisdictional region and the second jurisdictional region; and
execute the machine learning logic to iteratively and continuously update the at least one obligation model of the ontology, wherein continuously updating the at least one obligation model includes continuously synchronizing information from the at least one data source in the ontology to form associations between the at least one obligation model and alternative models to enhance an accuracy of the machine learning logic in identifying additional laws, policies, regulations, or combinations thereof.

8. The system of claim 7, wherein the executable instructions further ingest the text data from the one or more data sources upon processing the text data using a lexical analysis, parsing, extraction of concepts, semantic analysis, or a combination thereof.

9. The system of claim 7, wherein the executable instructions further identify a defined scope of compliance required by the law, the policy, the regulation, or a combination thereof.

10. The system of claim 7, wherein the executable instructions further use natural language processing (NLP) to determine the one or more segments with obligation content, wherein the one or more segments are sentences and the obligation content requires the obligation to conform to the law, the policy, the regulation, or a combination thereof.

11. The system of claim 7, wherein the executable instructions further generate a compliance corpus from training one or more machine learning models for managing regulatory compliance.

12. The system of claim 7, wherein the executable instructions further define the obligation as a required action for compliance with the law, the policy, the regulation, a prohibition of conduct, behavior, or activity of the entity, a legal right, a constraint of the entity, or a combination thereof.

13. A computer program product for, by one or more processors, managing regulatory compliance for an entity in a computing environment, the computer program product comprising a non-transitory computer-readable storage medium having computer-readable program code portions stored therein, the computer-readable program code portions comprising:
an executable portion that receives text data from one or more data sources;
an executable portion that extracts one or more segments of the text data according to the one or more segments of the text data including information associated with a predefined obligation constraint, wherein the predefined obligation constraint includes obligatory language having at least one clause;
an executable portion that executes machine learning logic to train, in a first training stage, a sentence classifier to determine the at least one clause is a definite obligatory requirement, wherein the sentence classifier is trained using a supervised machine learning operation;

an executable portion that executes the machine learning logic to train, in a second training stage, the sentence classifier to identify the entity within the one or more segments of the text data, wherein training the sentence classifier in the second training stage includes executing the machine learning logic to associate the definite obligatory requirement with the entity;

an executable portion that identifies, according to an implementation of the trained sentence classifier, a law, a policy, a regulation, or a combination thereof extracted from one or more segments of text data from one or more data sources requiring an obligation to be performed by the entity, wherein the law, the policy, the regulation, or the combination thereof is incorporated into at least one obligation model of an ontology;

an executable portion that executes the machine learning logic to generate a cluster of entities, inclusive of the entity, to associate the obligation with respective entities of the cluster of entities, wherein a clustering operation is performed to generate the cluster of entities for compliance analytics to differentiate the respective entities with respect to a burden of the respective entities to the obligation;

an executable portion that annotates the one or more segments of the text data according to the identifying by applying, within the text data, an obligation target tag to the entity governed by the obligation, an obligation content tag to descriptive portions of the obligatory language, a definition target tag to a referent of the obligation, and a definition content tag to descriptive portions of the referent;

an executable portion that, in conjunction with differentiating the respective entities, receives a user query through an interface, in natural language, specifying a first jurisdictional region and a second jurisdictional region different from the first jurisdictional region, a subject, and an inquiry of specific differences of the law, the policy, the regulation, or the combination thereof with respect to the subject between the first jurisdictional region and the second jurisdictional region; and an executable portion that executes the machine learning logic to iteratively and continuously update the at least one obligation model of the ontology, wherein continuously updating the at least one obligation model includes continuously synchronizing information from the at least one data source in the ontology to form associations between the at least one obligation model and alternative models to enhance an accuracy of the machine learning logic in identifying additional laws, policies, regulations, or combinations thereof.

14. The computer program product of claim 13, further including an executable portion that ingests the text data from the one or more data sources upon processing the text data using a lexical analysis, parsing, extraction of concepts, semantic analysis, or a combination thereof.

15. The computer program product of claim 13, further including an executable portion that identifies a defined scope of compliance required by the law, the policy, the regulation, or a combination thereof.

16. The computer program product of claim 13, further including an executable portion that:

uses natural language processing (NLP) to determine the one or more segments with obligation content, wherein the one or more segments are sentences and the obligation content requires the obligation to conform to the law, the policy, the regulation, or a combination thereof; or generates a compliance corpus from training one or more machine learning models for managing regulatory compliance.

17. The computer program product of claim 13, further including an executable portion that defines the obligation as a required action for compliance with the law, the policy, the regulation, a prohibition of conduct, behavior, or activity of the entity, a legal right, a constraint of the entity, or a combination thereof.

* * * * *